US011769233B1

(12) United States Patent
Poulin et al.

(10) Patent No.: US 11,769,233 B1
(45) Date of Patent: Sep. 26, 2023

(54) RANDOM IMAGE SUBSTITUTION USED FOR VIDEO REDACTION

(71) Applicant: MOTOROLA SOLUTIONS, INC., Chicago, IL (US)

(72) Inventors: Jean-Yves Poulin, Gatineau (CA); Tetyana Gutsol, Chicago, IL (US); Jesus F Corretjer, Weston, FL (US); Laird S Garner, Winston-Salem, NC (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 17/810,751

(22) Filed: Jul. 5, 2022

(51) Int. Cl.
*G11B 27/00* (2006.01)
*G11B 27/10* (2006.01)
*G11B 27/036* (2006.01)
*G06T 5/00* (2006.01)
*G06V 20/40* (2022.01)
*G06V 10/62* (2022.01)
*G06V 40/16* (2022.01)
*G06V 10/74* (2022.01)
*G06T 5/50* (2006.01)
*G06V 20/62* (2022.01)
*G06F 21/62* (2013.01)

(52) U.S. Cl.
CPC .......... *G06T 5/005* (2013.01); *G06F 21/6245* (2013.01); *G06T 5/50* (2013.01); *G06V 10/62* (2022.01); *G06V 10/761* (2022.01); *G06V 20/46* (2022.01); *G06V 20/49* (2022.01); *G06V 20/625* (2022.01); *G06V 40/16* (2022.01); *G11B 27/036* (2013.01); *G11B 27/10* (2013.01); *G06T 2207/10016* (2013.01); *G06T 2207/30201* (2013.01); *G06T 2207/30232* (2013.01)

(58) Field of Classification Search
USPC .................. 386/278, 280, 282, 239, 248
See application file for complete search history.

(56) References Cited

U.S. PATENT DOCUMENTS

| | | | |
|---|---|---|---|
| 9,060,095 B2 | 6/2015 | Peterson et al. | |
| 9,799,096 B1 | 10/2017 | De La Torre et al. | |
| 10,008,240 B2 * | 6/2018 | Koide | G06V 10/235 |
| 10,945,042 B2 * | 3/2021 | Rabbat | H04N 21/44008 |
| 11,244,488 B2 * | 2/2022 | Watanabe | G06V 20/52 |
| 2004/0008873 A1 * | 1/2004 | Sogo | G06V 40/172 |
| | | | 382/118 |
| 2004/0081338 A1 * | 4/2004 | Takenaka | G06T 5/002 |
| | | | 382/118 |
| 2012/0327172 A1 * | 12/2012 | El-Saban | G06T 7/174 |
| | | | 348/14.02 |
| 2015/0161467 A1 * | 6/2015 | Honda | G06V 40/161 |
| | | | 382/203 |
| 2021/0035047 A1 | 2/2021 | Mossoba et al. | |

\* cited by examiner

*Primary Examiner* — Daquan Zhao

(57) ABSTRACT

A computer-implemented method for video redaction of disclosure-protected objects is disclosed. A system for video redaction of disclosure-protected objects is also disclosed. A computer program product video redaction of disclosure-protected objects is also disclosed. A video interval may be broken into a plurality of sub-intervals, and unique random image substitution may be carried out over each of the sub-intervals in connection with the video redaction.

18 Claims, 4 Drawing Sheets

RANDOM IMAGE SUBSTITUTION USED FOR VIDEO REDACTION

BACKGROUND

In the context of video viewing and recording, redaction can be carried out to obscure certain video image details (for example, portions of video image frames in a video image stream). Also, one or more objects can be targeted as part of the portions of a video to be redacted. For example, security footage may include private information (such as, for example, license plates and faces) that need to be redacted to allow publishing or dissemination in a manner that would otherwise violate privacy. When video footage is used in a public manner, one has to consider whether there is some legal or other requirement to obscure people's faces, objects displaying disclosure-protected text, or other objects, in order to address privacy concerns.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
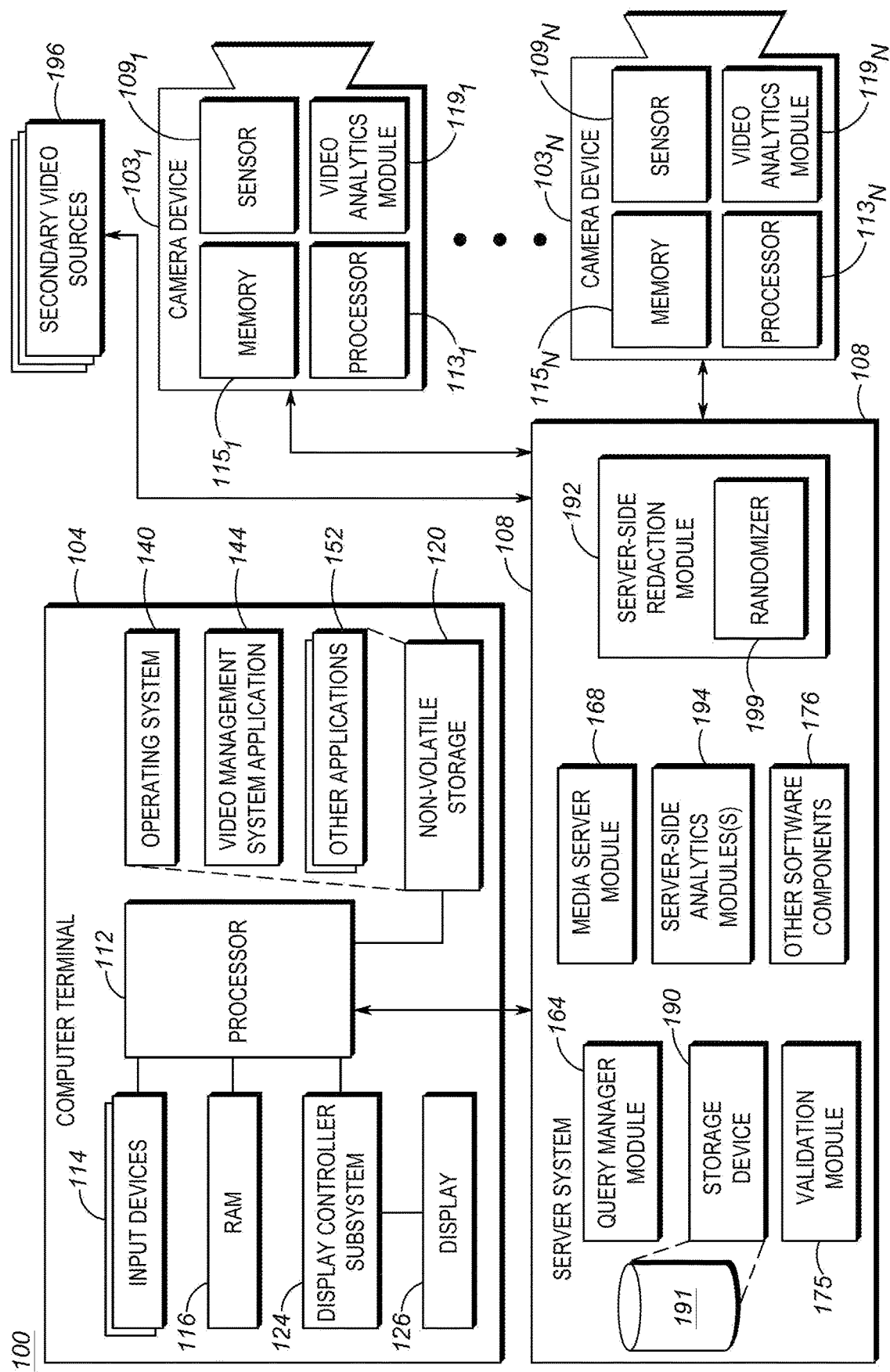
FIG. 1 is a block diagram of a video system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer-implemented method that includes identifying, using at least one processor, a disclosure-protected object within video. The disclosure-protected object appears within the video for a video interval starting and ending at a first point in time and a second point in time, respectively. The computer-implemented method also includes obtaining, using the at least one processor, time-dependent feature data for the disclosure-protected object corresponding to the video interval. The computer-implemented method also includes dividing, using the at least one processor, the video interval into a plurality of video sub-intervals of differing time durations. The computer-implemented method also includes dividing, in time-based uniformity with the dividing of the video interval, the time-dependent feature data into a respective plurality of feature data subsets. The computer-implemented method also includes generating, using the at least one processor, a plurality of image region replacements, wherein each image region replacement of the plurality of image region replacements is selectively matched, including being organized in a defined time appearance order, to a respective one of the plurality of video sub-intervals for the disclosure-protected object. The computer-implemented method also includes employing the image region replacements, to sequentially redact the disclosure-protected object from the video in the defined appearance order. Each of the plurality of image region replacements is: unique to a respective one of the video sub-intervals, and selected based on feature similarity to a respective feature data subset corresponding to the respective one of the video sub-intervals.

According to another example embodiment, there is provided a system that includes a video camera configured to capture video. A disclosure-protected object appears within the video for a video interval starting and ending at a first point in time and a second point in time, respectively. The system also includes at least one tangible computer-readable storage medium in communication with at least the video camera. The storage medium is configured to store the video. The system also includes at least one processor in communication with at least the storage medium. The at least one processor is configured to identify the disclosure-protected object within the video. The at least one processor is also configured to obtain time-dependent feature data for the disclosure-protected object corresponding to the video interval. The at least one processor is also configured to divide the video interval into a plurality of video sub-intervals of differing time durations, and also divide, in time-based uniformity with the dividing of the video interval, the time-dependent feature data into a respective plurality of feature data subsets. The at least one processor is configured to generate a plurality of image region replacements. Each image region replacement of the plurality of image region replacements is selectively matched, including being organized in a defined time appearance order, to a respective one of the plurality of video sub-intervals for the disclosure-protected object. The at least one processor is also configured to employ the image region replacements, to sequentially redact the disclosure-protected object from the video in the defined appearance order. Each of the plurality of image region replacements is unique to a respective one of the video sub-intervals, and selected based on feature similarity to a respective feature data subset corresponding to the respective one of the video sub-intervals.

Each of the above-mentioned embodiments will be discussed in more detail below, starting with example system and device architectures of the system in which the embodiments may be practiced, followed by an illustration of processing blocks for achieving an improved technical method, system and computer program product for video redaction. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

The term "object" as used herein is understood to have the same meaning as would normally be given by one skilled in the art of video analytics, and examples of objects may include moving objects such as, for instance, humans, faces, vehicles, license plates attached to vehicles, animals, etcetera. Examples of objects also include static objects such as, for instance, buildings, roads, signs attached to buildings or other fixed-location structures, fixtures, etcetera.

Further advantages and features consistent with this disclosure will be set forth in the following detailed description, with reference to the figures.

Referring now to the drawings, and in particular FIG. 1 which is a block diagram of an example video system 100 within which methods in accordance with example embodiments can be carried out. Included within the illustrated video system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108. In some examples, part or all of the server system 108 is provided within the video system 100 by way of a cloud computing implementation.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126.

Still with reference to the computer terminal 104 of the video system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, Video Management System (VMS) application 144, and other applications 152, or parts thereof, may be temporarily loaded into a volatile store such as the RAM 116. The processor 112, in addition to its operating system functions, can enable execution of the various software applications on the computer terminal 104.

Regarding the VMS application 144, this can be run on the computer terminal 104 and may include a search User Interface (UI) module for cooperation with a search session manager module in order to enable a computer terminal user to carry out actions related to providing input in relation to images, live video and video recordings (such as, for example, input to facilitate any one or more of annotating, redacting or selectively exporting video footage captured by one or more video security cameras, providing responses to alerts in relation to unusual/suspicious activities, etcetera). Also, regarding the aforementioned search session manager module, this provides a communications interface between the search UI module and a query manager module 164 of the server system 108. In at least some examples, the search session manager module communicates with the query manager module 164 through the use of Remote Procedure Calls (RPCs). The query manager module 164 receives and processes queries originating from the computer terminal 104, which may facilitate retrieval and delivery of various sorts of data and metadata (such as, for instance, video and metadata related to disclosure-protected objects). In this regard, the query manager module 164 is communicatively coupled to an at least one storage device 190 (described later herein in more detail).

Referring once again to FIG. 1, the server system 108 includes several software components (besides the query manager module 164 already described) for carrying out other functions of the server system 108. For example, the server system 108 includes a media server module 168. The media server module 168 handles client requests related to storage and retrieval of security video taken by video camera devices $103_1$-$103_n$, in the video system 100. In some examples, the media server module 168 may carry out other functions in relation to other forms of media communicated to the computer terminal 104 from the server system 108 (for example, facilitating the delivery of video clip alarms to the VMS application 144 to be viewed on the display 126 of the computer terminal 104). The server system 108 also includes server-side analytics module(s) 194 which can include, in some examples, any suitable one of known commercially available software that carry out computer vision related functions (complementary to any video analytics performed in the video cameras) as understood by a person of skill in the art. The server system 108 also includes a server-side redaction module 192 (described later herein in more detail).

The illustrated server system 108 also includes a validation module 175 for validating data in real or near-real time. For example, a random license plate number generated by randomizer 199 (described later herein in more detail) may be validated by operation of the validation module 175. For instance, the validation module 175 may cause the server system 108 to communicate a suitable validation request over network(s) to a system of an authoritative agency to verify whether or not the generated license plate number corresponds to an actually existing license plate.

The server system 108 also includes a number of other software components 176. These other software components will vary depending on the requirements of the server system 108 within the overall system. As just one example, the other software components 176 might include special test and debugging software, or software to facilitate version updating of modules within the server system 108.

Regarding the at least one storage device 190, this comprises, for example, one or more databases 191 which may facilitate the organized storing of recorded security video in accordance with example embodiments. The one or more databases 191 may also contain stock video clips or stock footage to provide a source for generating image replacements in accordance with example embodiments. The one or more databases 191 may also contain metadata related to, for example, the recorded security video (as well as the stock video clips or stock footage) that is storable within one or more storages. The one or more databases 191 may also contain other types of metadata besides video metadata. Examples of metadata other than video metadata, that may be stored in the one or more databases 191, include audio metadata, GPS location metadata, etcetera.

The illustrated video system 100 includes a plurality of video camera devices $103_1$-$103_n$, (hereinafter interchangeably referred to as "video cameras $103_1$-$103_n$" when referring to all of the illustrated cameras, or "video camera 103" when referring to any individual one of the plurality) being operable to capture a plurality of images and produce image data representing the plurality of captured images. The video camera 103 is an image capturing device and includes security video cameras. Furthermore, it will be understood that the video system 100 includes any suitable number of cameras (i.e. n is any suitable integer greater than one).

The video camera 103 includes an image sensor 109 for capturing a plurality of images. The video camera 103 may be a digital video camera and the image sensor 109 may output captured light as digital data. For example, the image sensor 109 may be a CMOS, NMOS, or Charge-Couple Device (CCD). In some embodiments, the video camera 103 may be an analog camera connected to an encoder. The illustrated video camera 103 may be a 2D camera; however use of a structured light 3D camera, a time-of-flight 3D camera, a 3D Light Detection and Ranging (LiDAR) device, a stereo camera, or any other suitable type of camera within the video system 100 is contemplated.

The image sensor 109 may be operable to capture light in one or more frequency ranges. For example, the image sensor 109 may be operable to capture light in a range that substantially corresponds to the visible light frequency range. In other examples, the image sensor 109 may be operable to capture light outside the visible light range, such as in the infrared and/or ultraviolet range. In other examples, the video camera 103 may have similarities to a "multi-sensor" type of camera, such that the video camera 103 includes pairs of two or more sensors that are operable to capture light in different and/or same frequency ranges.

The video camera 103 may be a dedicated video camera. It will be understood that a dedicated video camera herein refers to a video camera whose principal features is to capture images or video. In some example embodiments, the dedicated video camera may perform functions associated with the captured images or video, such as but not limited to processing the image data produced by it or by another camera. For example, the dedicated video camera may be a security camera, such as any one of a pan-tilt-zoom camera, dome camera, in-ceiling camera, box camera, and bullet camera.

Additionally, or alternatively, the video camera 103 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, physical access control device, video game console or controller.

The video camera 103 includes one or more processors 113, one or more video analytics modules 119, and one or more memory devices 115 coupled to the processors and one or more network interfaces. Regarding the video analytics module 119, this generates metadata outputted to the server system 108. The metadata can include, for example, records which describe various detections of objects such as, for instance, pixel locations for a detected moving object in respect of a first record and a last record for the video camera within which the respective metadata is being generated.

Regarding the memory device 115 within the video camera 103, this can include a local memory (such as, for example, a random access memory and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vision processing unit (operating optionally in combination with an artificial intelligence image signal processor), etcetera, and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the video camera 103, including the processor 113, may be combined together on one semiconductor chip. For example, the processor 113, the memory device 115 and the network interface of the video camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store in memory (including store in volatile memory, non-volatile memory, dynamic memory, etc. or any combination thereof).

Continuing with FIG. 1, the video camera 103 is coupled to the server system 108. In some examples, the video camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the video camera 103 and the server system 108 can be any number of known arrangements, examples of which were previously herein detailed. In at least one example embodiment, the video camera 103 and the server system 108 are within the same Local Area Network (LAN).

The one or more secondary video sources 196 may be external or internal to the illustrated video system 100. The secondary video sources 196 may include storage devices that store various types of secondary video data (including stock video clips or stock footage, for generating image replacements, in combination or in alternative to any stock video clips or stock footage stored in the storage device 190). In some examples, the secondary video sources 196 may be in the cloud and/or located in third party systems, auxiliary systems, etc.

In some examples, the secondary video sources 196 are coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the secondary video sources 196 and the server system 108 can be any number of known arrangements, examples of which were previously herein detailed. In some examples, the secondary video sources 196 may be coupled to the server system 108 in a more direct manner than as described above.

Figure 2:
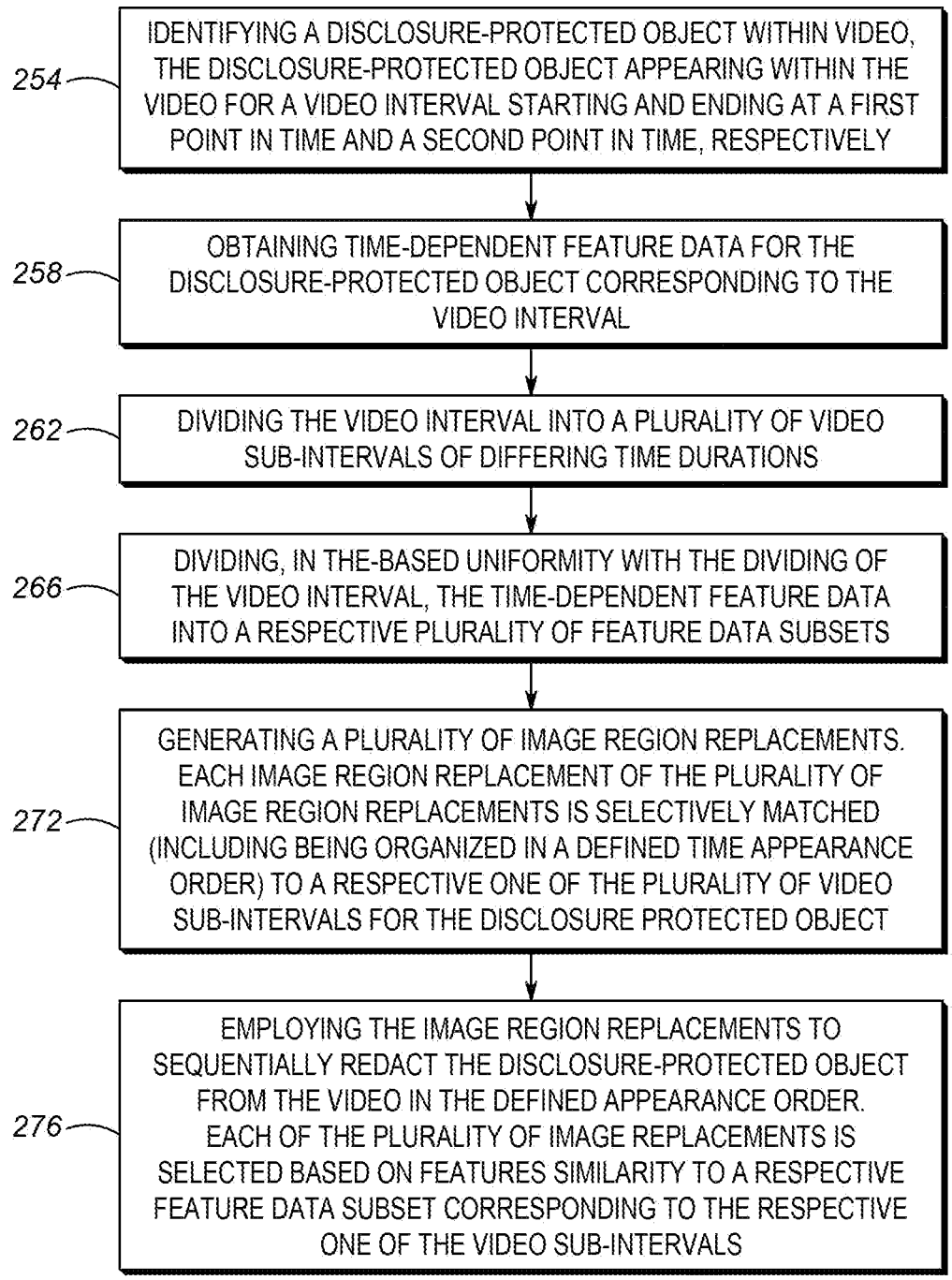
FIG. 2 is a flow chart illustrating a method in accordance with an example embodiment.
Figure 3:
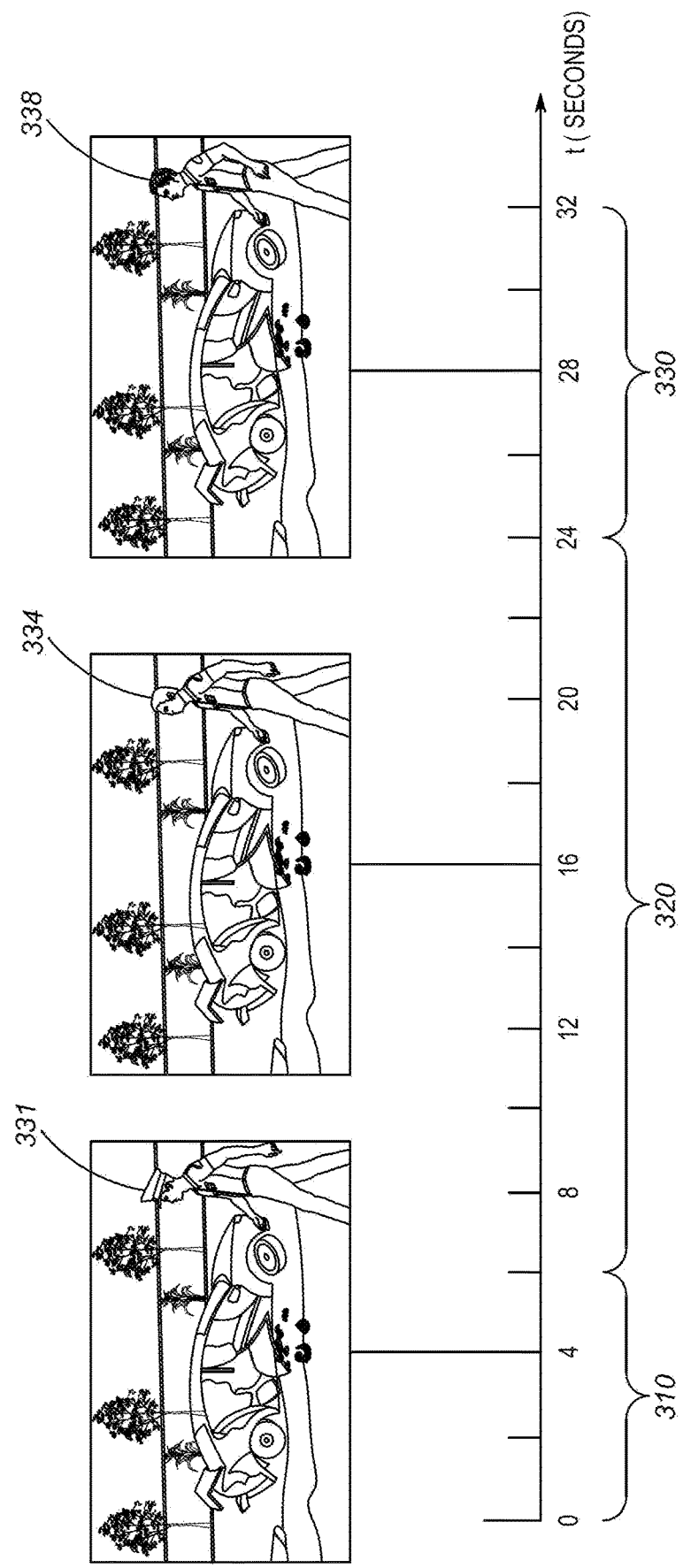
FIG. 3 is a diagram depicting face redaction in accordance with an example embodiment.
Figure 4:
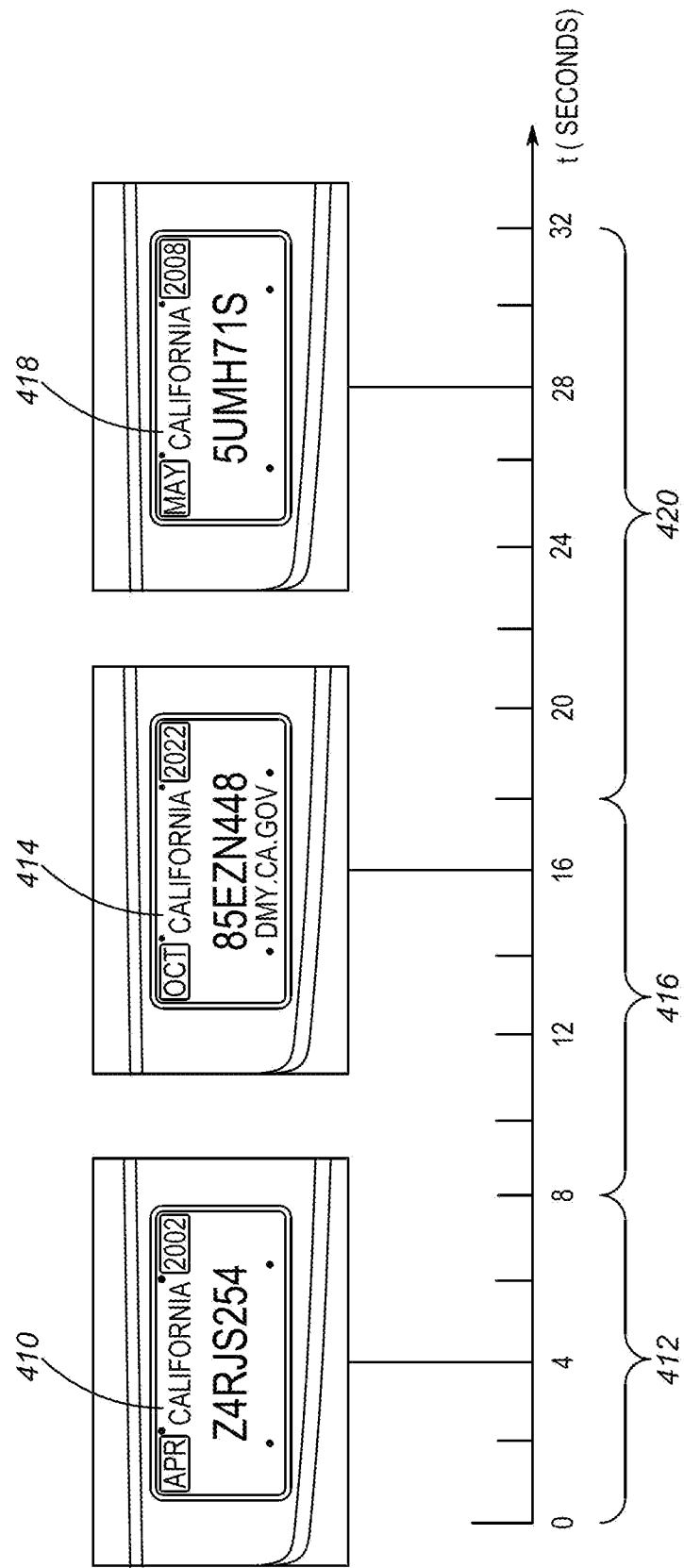
FIG. 4 is a diagram depicting license plate redaction in accordance with an example embodiment.

Reference is now made to FIGS. 2-4. Firstly, FIG. 2 is a flow chart illustrating a method 250 in accordance with an example embodiment. Secondly, FIG. 3 is a diagram depicting face redaction which may correspond to redacting in accordance with the method 250. Thirdly, FIG. 4 is a diagram depicting license plate redaction which may correspond to redacting in accordance with the method 250.

Referring to FIG. 2, the illustrated method 250, which in some examples is carried out within the video system 100, includes identifying (254) a disclosure-protected object within video. More specifically, the disclosure-protected object is an object that is appearing within the video for a video interval that starts at a first point in time and ends at a second point in time. For example, in FIG. 3 the disclosure-protected object is a face of a person appearing within a video interval of a video (the video interval starting at a "0 seconds" point in time, and ending at a "32 seconds" point in time). As another example, in FIG. 4 the disclosure-protected object is a license plate of a vehicle appearing within a video interval of a video (the video interval starting at a "0 seconds" point in time, and ending at a "32 seconds" point in time).

Next the method 250 includes obtaining (258) time-dependent feature data for the disclosure-protected object corresponding to the video interval. Taking the example of where the face is the disclosure-protected object, the feature data for the face may change over the video interval such as, for instance, an expression on the face, the direction in which the face is oriented in relation to the video camera, face angle, etcetera. Taking another example of where the license plate is the disclosure-protected object, again the feature data for the license plate may change over the video interval such as, for instance, a shadow (or lack thereof) on the license plate, the direction in which the license plate is oriented in relation to the video camera, etcetera.

Next the method 250 includes dividing (262) the video interval into a plurality of video sub-intervals of differing time durations. Referring to the example embodiment of FIG. 3, the 32 second interval is sub-divided into three sub-intervals: sub-interval 310, sub-interval 320 and sub-interval 330. (In regards to FIG. 4, the video interval shown therein is similarly sub-divided.) In some examples, each of the sub-intervals takes on a different random duration of time as determined by the randomizer 199 of the server-side redaction module 192 (which may be, for instance, a randomization engine or a pseudo-randomization engine). Also, it will be understood that division into three sub-intervals is just for the purposes of illustration (division may suitably be carried out into any appropriate number of sub-intervals).

Next the method 250 includes dividing (266) the time-dependent feature data into a respective plurality of feature data subsets. The dividing (266) of the time-dependent feature data is done in time-based uniformity with the dividing of the video interval. Referring to the example embodiment of FIG. 3, the time-dependent feature data for all of the illustrated video interval may be divided into three parts with each part matched to a respective one of the sub-intervals 310, 320 and 330. For instance, in one of the sub-intervals the respective feature data part could reflect that the face is frowning in that sub-interval, whereas in one of the sub-intervals the respective feature data part could reflect that the face has a neutral expression in that sub-interval.

Next the method 250 includes generating (272) a plurality of image region replacements. Each image region replacement of the plurality of image region replacements is selectively matched (including being organized in a defined time appearance order) to a respective one of the plurality of video sub-intervals for the disclosure-protected object. In some examples, the image region replacements are generated by one or more processors within the video system 100 such as, for instance, by extracting them from the stock video clips or stock footage stored within the secondary video sources 196 or the database 191. It also contemplated that suitable fake/artificial video clips may be dynamically generated (for example, generated contemporaneously to the redaction process) using emerging techniques such as, for instance, those involving the use of generative adversarial network(s).

Next the method 250 includes employing (276) the image region replacements, to sequentially redact the disclosure-protected object from the video in the defined appearance order. Each of the plurality of image region replacements is, along with being unique to a respective one of the video sub-intervals, selected based on feature similarity to a respective feature data subset corresponding to the respective one of the video sub-intervals. The selection may be facilitated at least in part by artificial intelligence (such as, for example, one or more learning machines trained to make selections based on feature similarity).

Referring to the example embodiment of FIG. 3, the image region replacements are face replacements. More specifically, the following are shown in FIG. 3: a first face replacement 331 that is displayed during the sub-interval 310, a second face replacement 334 that is displayed during the sub-interval 320, a third face replacement 338 that is displayed during the sub-interval 330. As contrasted to the example embodiment of FIG. 3, in FIG. 4 the image region replacements are license plate replacements instead of are face replacements. More specifically, the following are shown in FIG. 4: a first license plate replacement 410 that is displayed during sub-interval 412, a second license plate replacement 414 that is displayed during the sub-interval 416, a third license plate replacement 418 that is displayed during the sub-interval 420.

In some examples, the order of appearance of each of the image region replacements may be randomized (or pseudo-randomized) by the randomizer 199.

Each image region replacement may be unique to the respective video sub-interval to which it is matched. For instance, in the case of face replacements each of a plurality of face replacement being employed over an entire video interval may correspond to a unique face (at least slightly different than any other face of the face replacements being employed). Also, the selection of each image region replacement may be based on maintaining a sufficient degree of feature similarity to a respective feature data subset corresponding to the respective one of the video sub-intervals. While so-called "doppelgangers" of any one person tend to be somewhat rare, with a sufficiently large enough size of a library of videos of people, it is possible to find a plurality of people, each being a different person, but with these people collectively having faces that share a degree of feature similarity as between each of the individually different faces. In some examples, the feature similarity is one or more common characteristics (for instance, one or more of age, gender, skin color and hair color that is the same as between each different face). One impact of keeping feature similarity across different image replacements is the possibility of preserving some information that would be lost in the conventional approaches like just blurring or blacking out the disclosure-protected object. For example, if the face being redacted is frowning during a particular sub-interval of video, then a frowning face replacement preserves the information that, during that particular sub-interval of video, the person attached to the face was frowning. Another impact of keeping feature similarity across different image replacements is the possibility of concealing a missed redaction. For example, suppose that during the sub-interval 320 a redaction of the face of the police officer was missed (i.e. the second face replacement 334 is in fact the actual face of the police officer). In such a case, it is possible that the negative impact of the missed redaction may be minimized in view of the actual revealed face not being glaringly different from the first face replacement 331 and the third face replacement 338. Another motivation to match the faces according to feature similarity is to match other body parts of the person that may be exposed in the video images. For instance, it looks suspicious (more identifiably wrong) if a head is replaced with one with blond hair where the remainder of the person in the picture (to which the head is connected) has brown hair on their arms.

Turning to the case where the disclosure-protected object is a license plate, it is similarly possible to find videos of different license plates, and where there is a degree of similarity between each of them. For example, it may be suitable to group together a plurality of different license plates from the same state or province. While each license plate of this grouping of different license plates may each have a different license plate number, the degree of similarity in such a case will relate to at least one other characteristic that is matched to an at least one characteristic of the license plate being redacted out. Examples of matchable license plate characteristics are as follows: license plate jurisdiction, type of license plate visibility impairment (for instance, partial snow cover, rust, etcetera), license plate color, license plate shape.

While much of the above discussion referenced faces and license plates as examples of redactable objects to which example embodiments are applicable. Other examples of disclosure-protected objects are contemplated as well. For instance, the disclosure-protected object may be a computer screen or a credit card. In the case of a computer screen, the plurality of image region replacements may depict a respective plurality of other computer screens showing non-sensitive images and/or text, and these other text-displaying screens are each different from the text-displaying screen that needs to be redacted out.

Sometimes reflections of objects can depict sensitive information. Thus, in accordance with some examples, a randomized reflection replacement image is employed to redact out an object reflection (the randomized reflection replacement image depicts something different than the object reflection being redacted out). The randomized reflection replacement image may have at least one observable characteristic that is matched to the object reflection being redacted out.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot act on video to redact disclosure-protected objects, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate element or device via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
identifying, using at least one processor, a disclosure-protected object within video, the disclosure-protected object appearing within the video for a video interval starting and ending at a first point in time and a second point in time, respectively;
obtaining, using the least one processor, time-dependent feature data for the disclosure-protected object corresponding to the video interval;
dividing, using the at least one processor, the video interval into a plurality of video sub-intervals of differing time durations;
dividing, in time-based uniformity with the dividing of the video interval, the time-dependent feature data into a respective plurality of feature data subsets;
generating, using the at least one processor, a plurality of image region replacements, wherein each image region replacement of the plurality of image region replacements is selectively matched, including being organized in a defined time appearance order, to a respective one of the plurality of video sub-intervals for the disclosure-protected object; and
employing the image region replacements, to sequentially redact the disclosure-protected object from the video in the defined appearance order, and
wherein each of the plurality of image region replacements is:
unique to a respective one of the video sub-intervals, and
selected based on feature similarity to a respective feature data subset corresponding to the respective one of the video sub-intervals.

2. The computer-implemented method of claim 1 wherein the disclosure-protected object is a first face of a first person, and the plurality of image region replacements depict a respective plurality of second faces of second people, and the first person is different from each of the second people.

3. The computer-implemented method of claim 2 wherein a randomization engine or a pseudo-randomization engine is employed to dictate when each second face of the plurality of second faces appears within the defined time appearance order, and a length of each duration of the differing time durations.

4. The computer-implemented method of claim 2 wherein a face angle of each second face of the plurality of second faces is dynamically adjusted over an appearance time to match a face angle of the first face that changes over the appearance time.

5. The computer-implemented method of claim 2 wherein each second face of the plurality of second faces possesses at least one second characteristic that is matched to an at least one first characteristic of the first face, and wherein the at least one first characteristic is one or more of age, gender, skin color and hair color.

6. The computer-implemented method of claim 1 further comprising:
identifying a first object reflection within the video; and
redacting out the first object reflection with at least one randomized replacement image that depicts a second object reflection different than the first object reflection.

7. The computer-implemented method of claim 6 wherein the first object reflection is caused by the disclosure-protected object, and the second object reflection has at least one observable characteristic that is matched to the first object reflection.

8. The computer-implemented method of claim 1 wherein the disclosure-protected object is a first text-displaying object, and the plurality of image region replacements depict a respective plurality of second text-displaying objects, and the first text-displaying object is different from each of the second text-displaying objects.

9. The computer-implemented method of claim 8 wherein a randomization engine or a pseudo-randomization engine is employed to dictate when each second text-displaying object of the plurality of second text-displaying objects appears within the defined time appearance order, and a length of each duration of the differing time durations.

10. The computer-implemented method of claim 8 wherein the first text-displaying object is a license plate attached to a vehicle.

11. The computer-implemented method of claim 8 wherein each second text-displaying object of the plurality of second text-displaying objects possesses at least one second characteristic that is matched to an at least one first characteristic of the first text-displaying object, and wherein the at least one first characteristic is one or more of a license plate jurisdiction, a type of license plate visibility impairment, a license plate color, and a license plate shape.

12. A system comprising:
a video camera configured to capture video, and wherein a disclosure-protected object appears within the video for a video interval starting and ending at a first point in time and a second point in time, respectively;
at least one tangible computer-readable storage medium in communication with at least the video camera, and the storage medium being configured to store the video; and
at least one processor in communication with at least the storage medium, and the at least one processor being configured to:
identify the disclosure-protected object within the video;
obtain time-dependent feature data for the disclosure-protected object corresponding to the video interval;
divide the video interval into a plurality of video sub-intervals of differing time durations, and also divide, in time-based uniformity with the dividing of the video interval, the time-dependent feature data into a respective plurality of feature data subsets;
generate a plurality of image region replacements, wherein each image region replacement of the plurality of image region replacements is selectively matched, including being organized in a defined time appearance order, to a respective one of the plurality of video sub-intervals for the disclosure-protected object; and
employ the image region replacements, to sequentially redact the disclosure-protected object from the video in the defined appearance order, and wherein each of the plurality of image region replacements is:
  unique to a respective one of the video sub-intervals, and
  selected based on feature similarity to a respective feature data subset corresponding to the respective one of the video sub-intervals.

13. The system of claim 12 wherein the disclosure-protected object is a first face of a first person, and the plurality of image region replacements depict a respective plurality of second faces of second people, and the first person is different from each of the second people.

14. The system of claim 12 wherein the disclosure-protected object is a first text-displaying object, and the plurality of image region replacements depict a respective plurality of second text-displaying objects, and the first text-displaying object is different from each of the second text-displaying objects.

15. The system of claim 14 wherein a randomization engine or a pseudo-randomization engine is employed to dictate when each second text-displaying object of the plurality of second text-displaying objects appears within the defined time appearance order, and a length of each duration of the differing time durations.

16. The system of claim 14 wherein the first text-displaying object is a license plate attached to a vehicle.

17. The system of claim 14 wherein each second text-displaying object of the plurality of second text-displaying objects possesses at least one second characteristic that is matched to an at least one first characteristic of the first text-displaying object, and wherein the at least one first characteristic is one or more of a license plate jurisdiction, a type of license plate visibility impairment, a license plate color, and a license plate shape.

18. The system of claim 12 wherein the at least one processor is contained within a server that is configured to communicate with the video camera over an at least one network.

* * * * *